United States Patent
Ibanez et al.

(10) Patent No.: US 12,060,846 B2
(45) Date of Patent: Aug. 13, 2024

(54) METHOD FOR DETERMINING THE ANGULAR POSITION OF A TOOTHED TARGET WHICH IS ROTATABLY SECURED TO A SHAFT OF AN INTERNAL COMBUSTION ENGINE

(71) Applicant: VITESCO TECHNOLOGIES GmbH, Hanover (DE)

(72) Inventors: Emmanuel Ibanez, Toulouse (FR); Stéphane Eloy, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 727 days.

(21) Appl. No.: 17/261,470

(22) PCT Filed: Jul. 18, 2019

(86) PCT No.: PCT/EP2019/069335
§ 371 (c)(1),
(2) Date: Jan. 19, 2021

(87) PCT Pub. No.: WO2020/016342
PCT Pub. Date: Jan. 23, 2020

(65) Prior Publication Data
US 2021/0222637 A1 Jul. 22, 2021

(30) Foreign Application Priority Data
Jul. 20, 2018 (FR) ...................... 1856767

(51) Int. Cl.
*F02D 41/00* (2006.01)
*G01D 5/244* (2006.01)
*G01D 5/245* (2006.01)

(52) U.S. Cl.
CPC ....... *F02D 41/009* (2013.01); *G01D 5/24471* (2013.01); *G01D 5/2457* (2013.01)

(58) Field of Classification Search
CPC .................. F02D 41/009; F02D 41/00; G01D 5/24471; G01D 5/2457; G01D 5/24495; G01B 5/166; G01M 15/06
See application file for complete search history.

(56) References Cited

U.S. PATENT DOCUMENTS 4,553,426 A 11/1985 Capurka
5,663,495 A 9/1997 Allen et al.
(Continued)

FOREIGN PATENT DOCUMENTS

CN 101365872 A 2/2009
CN 102900525 A 1/2013
(Continued)

OTHER PUBLICATIONS

Office Action issued in Chinese Patent Application No. 201980061701.7 dated Jun. 10, 2022.
International Search Report for PCT/EP2019/069335 dated Oct. 18, 2019, 7 pages.
Written Opinion of the ISA for PCT/EP2019/069335 dated Oct. 18, 2019, 7 pages.

*Primary Examiner* — Farhana A Hoque
*Assistant Examiner* — Dilara Sultana
(74) *Attorney, Agent, or Firm* — NIXON & VANDERHYE

(57) ABSTRACT

Disclosed is a method for determining the angular position of a toothed target which is rotationally secured to a shaft of an internal combustion engine. The method is based on dynamically determining a ratio between the different periods measured between the teeth of the target. Comparing the ratio with a threshold value allows identification, where appropriate, of an angular reference zone around the periphery of the toothed target.

20 Claims, 4 Drawing Sheets

(56) References Cited

U.S. PATENT DOCUMENTS

| | | | |
|---|---|---|---|
| 6,732,713 B1* | 5/2004 | Kanazawa | F02D 41/062 |
| | | | 123/406.6 |
| 6,840,236 B2* | 1/2005 | Takahashi | G01D 5/24461 |
| | | | 123/612 |
| 2007/0292120 A1* | 12/2007 | Galtier | F02D 41/009 |
| | | | 396/110 |
| 2008/0312865 A1 | 12/2008 | Zouboff | |
| 2013/0030755 A1 | 1/2013 | Zouboff et al. | |
| 2013/0151194 A1* | 6/2013 | Hawken | F02D 41/2425 |
| | | | 33/1 PT |
| 2015/0268063 A1 | 9/2015 | Lepage et al. | |
| 2017/0176288 A1 | 6/2017 | Eom et al. | |
| 2018/0080395 A1 | 3/2018 | Gouzenne Coutier | |
| 2018/0080396 A1 | 3/2018 | Marconato et al. | |
| 2018/0105132 A1 | 4/2018 | Burczyk et al. | |

FOREIGN PATENT DOCUMENTS

| | | |
|---|---|---|
| CN | 106948957 A | 7/2017 |
| CN | 107532529 A | 1/2018 |
| CN | 107743545 A | 2/2018 |
| DE | 10 2015 004 892 A1 | 10/2016 |
| FR | 2 818 737 | 6/2002 |
| FR | 2 860 069 | 3/2005 |
| FR | 2 894 664 | 6/2007 |
| FR | 2 978 542 | 2/2013 |
| WO | 2016/165829 | 10/2016 |

* cited by examiner

METHOD FOR DETERMINING THE ANGULAR POSITION OF A TOOTHED TARGET WHICH IS ROTATABLY SECURED TO A SHAFT OF AN INTERNAL COMBUSTION ENGINE

CROSS-REFERENCE TO RELATED APPLICATIONS

This application is the U.S. national phase of International Application No. PCT/EP2019/069335 filed Jul. 18, 2019 which designated the U.S. and claims priority to FR 1856767 filed Jul. 20, 2018, the entire contents of each of which are hereby incorporated by reference.

BACKGROUND OF THE INVENTION

Field of the Invention

The present invention relates in general to the control of an internal combustion engine. More particularly, it concerns determination of an angular position of a toothed target which is rotationally secured to a shaft of such an engine, allowing the engine control to be synchronized with its current angular position.

Description of the Related Art

Optimum operation of an internal combustion engine requires as precise as possible a knowledge of its angular position at each moment. Synchronization of various operations, such as opening of the valves, injection of fuel and ignition of the spark plugs, with the angular position of the engine in fact controls its function and performance. Said operations must be synchronized with the actual angular position in order to produce the desired propulsion effect. Otherwise, each operation performed at the wrong moment (i.e. the wrong angular position of the engine) causes a loss of energy. Instead of producing mechanical energy used for propulsion of the engine, the unburned or poorly combusted fuel also contributes to an emission of pollutants into the atmosphere.

In order to know the angular position of the crankshaft of an engine, it is known to use a toothed wheel (also called a target) which is rotationally secured to this crankshaft. This wheel is associated with a dedicated sensor whose role is to determine its angular position and rotational speed. The sensor detects the passage of each tooth in front of it and converts this information into an electrical signal which is received by an engine control unit. This engine control unit thus monitors the passage of each tooth of the wheel in real time in order to deduce therefrom its angular position at each moment. Furthermore, a singularity in the profile (which is otherwise regular) of the toothed wheel allows knowledge of the angular position of the wheel in absolute fashion and not simply relative. As soon as the sensor detects the singularity, the engine control unit recognises a reference angular position and deduces therefrom the absolute angular position of the toothed wheel.

Patent application FR 2978542 A1 discloses a method, the purpose of which is the reliable and robust detection of the reference zone of such a toothed wheel. The method is based on measurement of the instantaneous period of the signal generated by the sensor in order to allow detection of the reference zone. On each passage of a tooth k, the engine control unit determines the instantaneous period $T_k$ associated with this tooth. This period $T_k$ corresponds to the duration which has elapsed between an edge of the signal associated with this tooth and the same edge of the signal associated with the preceding tooth k−1 in the series of teeth. Conventionally, the engine control unit has a memory which contains the values of the instantaneous periods associated with at least the 120 last teeth detected. The oldest of these data are deleted concurrently with the acquisition of new data relative to the periods by the engine control unit. The singularity which defines the angular reference of the target is detected by determining a ratio between the periods $T_{k-2}$, $T_{k-1}$ and $T_k$ measured for three respective successive edges of the signal.

Thus each falling edge (but the same operational logic may be applied to each rising edge) of the signal generated by the sensor causes incrementation of a counter in the engine control unit which manages this function, in order to count the teeth detected by the sensor and deduce therefrom the angular position of the crankshaft. The angular position of the crankshaft is defined by the number of teeth counted after the detected reference zone. More precisely, the instantaneous angular position of the crankshaft is established by determining the difference between the instantaneous value of the counter and the value of the counter at the moment of detection of the last reference zone. The angular position of the crankshaft is then the angular value corresponding to this difference.

Sometimes however, a tooth of the toothed target is not detected by the sensor for various reasons. These reasons are generally electrical in origin (parasitic, poor contact) or mechanical (variation in distance between toothed wheel and sensor, vibrations etc.). For the same reasons, sometimes the sensor detects a tooth which does not exist in reality. If a tooth is not detected or is erroneously detected, the relationship between the counter value and the angular position of the crankshaft is no longer valid, since the counter value is no longer representative of the position of the tooth on the toothed target.

In this case, the error is only corrected at the time of detection of the second tooth situated after the reference zone, the next time this zone passes before the sensor. Thus the synchronization of the engine control operations degrades over the entire angular portion from incorrect detection of a tooth (by addition or omission) until detection of the second tooth following the reference zone. In this interval, the engine control is not ideal and may even be counter-effective from the aspect of generating engine torque. This may also cause increased pollution of the atmosphere by the engine.

SUMMARY OF THE INVENTION

The object of the invention is to alleviate these drawbacks of the method known from the prior art by allowing faster resynchronization in the case of error in counting the teeth of the target.

To this end, a first aspect of the invention proposes a method for determining the angular position of a toothed target which is rotationally secured to a shaft of an internal combustion engine, said toothed target comprising a series of teeth regularly spaced around the periphery of the target, of which firstly n teeth are consecutive real teeth followed secondly by m consecutive hypothetical teeth forming an angular reference zone, wherein n and m are integral numbers not equal to zero, said internal combustion engine comprising a sensor arranged to detect the passage of the real teeth of the toothed target before said sensor and generate a signal in response to said passage, and an engine control unit configured to receive said signal and from said signal, for each tooth of index k between 1 and n, measure the time period called period $T_k$ of the tooth with index k separating said tooth of index k from the preceding tooth of index k−1 in the series of teeth, characterized in that said method comprises the following steps:

c) determination of a first product by multiplying the period $T_k$ by itself;
d) determination of a second product by multiplying the period $T_{k-1}$ by the period $T_{k-2}$ of the tooth with index k−2 in the series;
e) determination of a first ratio, designated $R_1$, of the first product over the second product;
f) comparison of the first ratio $R_1$ with a first determined threshold value $R_{th1}$, and if and only if $R_1$ is greater than $R_{th1}$, identification of the angular reference zone and determination of an angular position of the toothed target and hence the angular position of the shaft of the internal combustion engine.

Embodiments taken individually or in combination further provide that:

the method also comprises the following steps if, during the comparison step f), the ratio $R_1$ is less than or equal to the first threshold value $R_{th1}$:

g) determination of a third product by multiplying the period $T_{k-1}$ of the tooth with index k−1 by itself;
h) determination of a fourth product by multiplying the period $T_{k-2}$ of the tooth with index k−2 by the period $T_k$ of the tooth with index k;
i) determination of a second ratio, designated $R_2$, of the third product over the fourth product;
j) comparison of the second ratio $R_2$ with the first threshold value $R_{th1}$, and if and only if $R_2$ is greater than $R_{th1}$, identification of the reference zone and determination of an angular position of the associated toothed target and hence the angular position of the shaft of the internal combustion engine.

The method also comprises, before step c) of determination of the ratio $R_1$, the following steps:

a) determination of a third ratio, designated $R_p$, of the period $T_k$ of the tooth with index k over the period $T_{k-1}$ of the tooth with index k−1;
b) comparison of the third ratio $R_p$ with a second determined threshold value $R_{th2}$;

and wherein steps c) to j) are executed as applicable if and only if $R_p$ is greater than $R_{th2}$.

The first threshold value $R_{th1}$ is between 2.5 and 4.5.
The first threshold value $R_{th1}$ is equal to 3.
The second threshold value $R_{th2}$ is equal to 1.4.
The steps of the method are only executed for values of index k, associated with the teeth of the target, between n−1 and 4.
The number n is equal to 58, and the number m is equal to 2.

In a second aspect, the object of the invention is also a device for determining the angular position of a toothed target which is rotationally secured to a shaft of an internal combustion engine, said toothed target comprising a series of teeth regularly spaced around the periphery of the target, of which firstly n teeth are consecutive real teeth followed secondly by m consecutive hypothetical teeth forming an angular reference zone, wherein n and m are integral numbers not equal to zero, said internal combustion engine comprising a sensor arranged to detect the passage of the real teeth of the toothed target before said sensor and generate a signal in response to said passage, and an engine control unit configured to receive said signal and from said signal, for each tooth of index k between 1 and n, measure the time period called period $T_k$ of the tooth with index k separating said tooth of index k from the preceding tooth of index k−1 in the series of teeth, said device being characterized in that the engine control unit comprises means for implementing the steps of the method for determining the angular position of a toothed target which is rotationally secured to a shaft of an internal combustion engine according to the invention.

BRIEF DESCRIPTION OF THE DRAWINGS

Other features and advantages of the invention will become more apparent upon reading the following description. This description is purely illustrative and should be read with reference to the appended drawings, in which.

DESCRIPTION OF THE PREFERRED EMBODIMENTS

Figure 1:
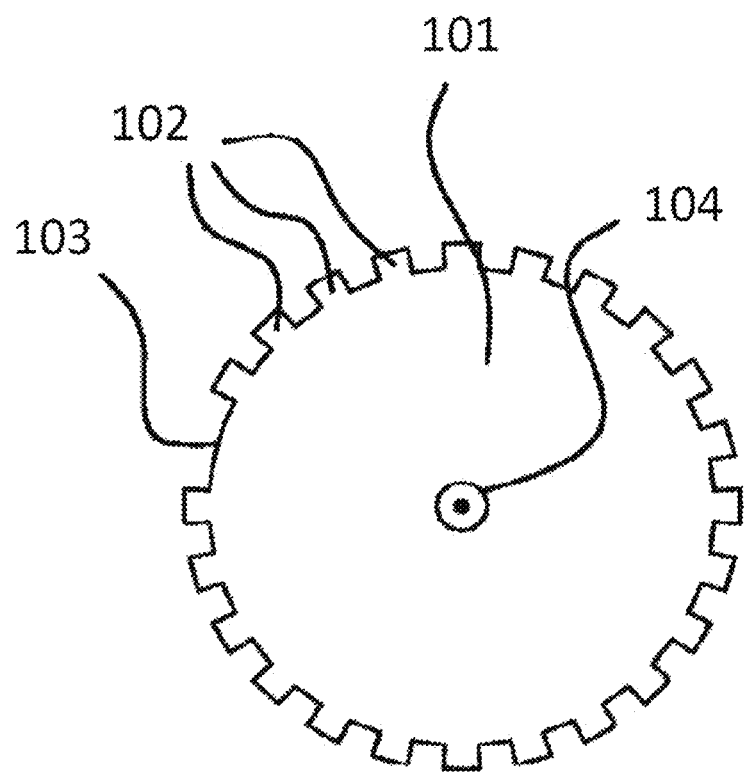
FIG. 1, already analyzed, shows an example of the toothed wheel intended to be rotationally secured to a shaft of an engine.

In the following description of the embodiments and in the figures of the attached drawings, the same or similar elements have the same numerical reference signs in the drawings.

The rotational movement of the engine arises from mechanical energy resulting from combustion of the fuel in one or more cylinders. This energy causes the linear motion of the piston(s) in the cylinder(s) of the engine. This linear motion is then transformed into rotary motion by a crankshaft driven by the piston(s).

More precisely, the operation of such an engine breaks down into operating cycles (also called combustion cycles) which themselves are composed of four phases:

intake of an air/fuel mixture into one or more cylinders of the engine;
compression of said mixture by one or more pistons in the cylinders;
combustion and expansion which initiates a movement of the piston(s); and
exhaust of the burnt gases.

The first two phases of an operating cycle take place during one complete revolution of the crankshaft (i.e. over 360 degrees). The second two phases take place during a second complete revolution of the crankshaft (i.e. over a further 360 degrees). The rotation of the crankshaft itself drives another shaft: the engine camshaft. One complete revolution of the engine camshaft then takes place for every two complete revolutions of the crankshaft.

The angular position of the engine at a given instant is therefore defined by information on the angular position of its crankshaft. This position must therefore be known at all moments in order to be able to control, at the opportune moment, the actuators which allow optimum combustion (instant of opening and closing of injectors, control of spark plugs etc.).

In other words, during a complete revolution of the engine, a large number of operations must take place which are linked to the progress of each cylinder in its respective operating cycle. These operations are called "angular events" in the trade.

FIG. 1 shows an example of a toothed wheel 101 intended to be rotationally secured to a shaft 104 of an engine, in this case a crankshaft. The wheel 101 has around its periphery a series of teeth 102 which enable a sensor (not shown) to follow its rotation. The teeth are substantially identical and regularly spaced. In this way, when the wheel turns, the sensor generates a periodic signal, the period of which directly depends on the speed with which the teeth pass before it. Thus if the wheel is turning at a constant speed, the period of the signal generated has a constant value. However, if the rotational speed of the wheel changes, the period of the signal generated by the sensor changes accordingly. In all cases, an engine control unit (not shown) receives the signal generated by the sensor and deduces therefrom the instantaneous rotational speed of the wheel.

Furthermore, on its periphery the wheel comprises an angular reference zone 103. This zone is otherwise known as a "gap" or "signature". It is created by the deliberate omission of a certain number of consecutive teeth on the periphery of the wheel. A space of several missing teeth thus allows the sensor to identify a reference angular position and deduce therefrom an absolute angular position of the toothed wheel. This absolute angular position is obtained by counting, at any moment, the number of teeth which have passed in front of the sensor since the angular reference zone was last detected.

The toothed wheel 101 has on its periphery a number n of real teeth 102 which are regularly spaced and followed by a number m of hypothetical consecutive teeth which form the reference zone 103. The numbers n and m are integers not equal to zero. The reference zone 103 therefore covers an angular zone equal to m times the width of a real tooth 102 plus that of m intertooth spaces. In the example shown in FIG. 1, the toothed wheel 101 comprises fifty-eight real teeth (n=58) and two hypothetical teeth (m=2). However, this way of measuring the rotational speed and angular position of a crankshaft may also be used with other types of toothed wheel. For example, wheels for which n is equal to thirty-six and m is equal to the unit. In the same way, certain toothed wheels have a reference zone which is formed not by missing teeth but by a solid tooth, the width of which covers the equivalent to that of several real teeth 102. Finally, the possibility of determining the rotational speed and absolute angular position of the toothed wheel lies in the fact that it comprises a minimum number of real teeth regularly spaced apart, and at least one singularity which the sensor may recognize in order to identify at least one angular reference zone on its periphery.

Figure 2:
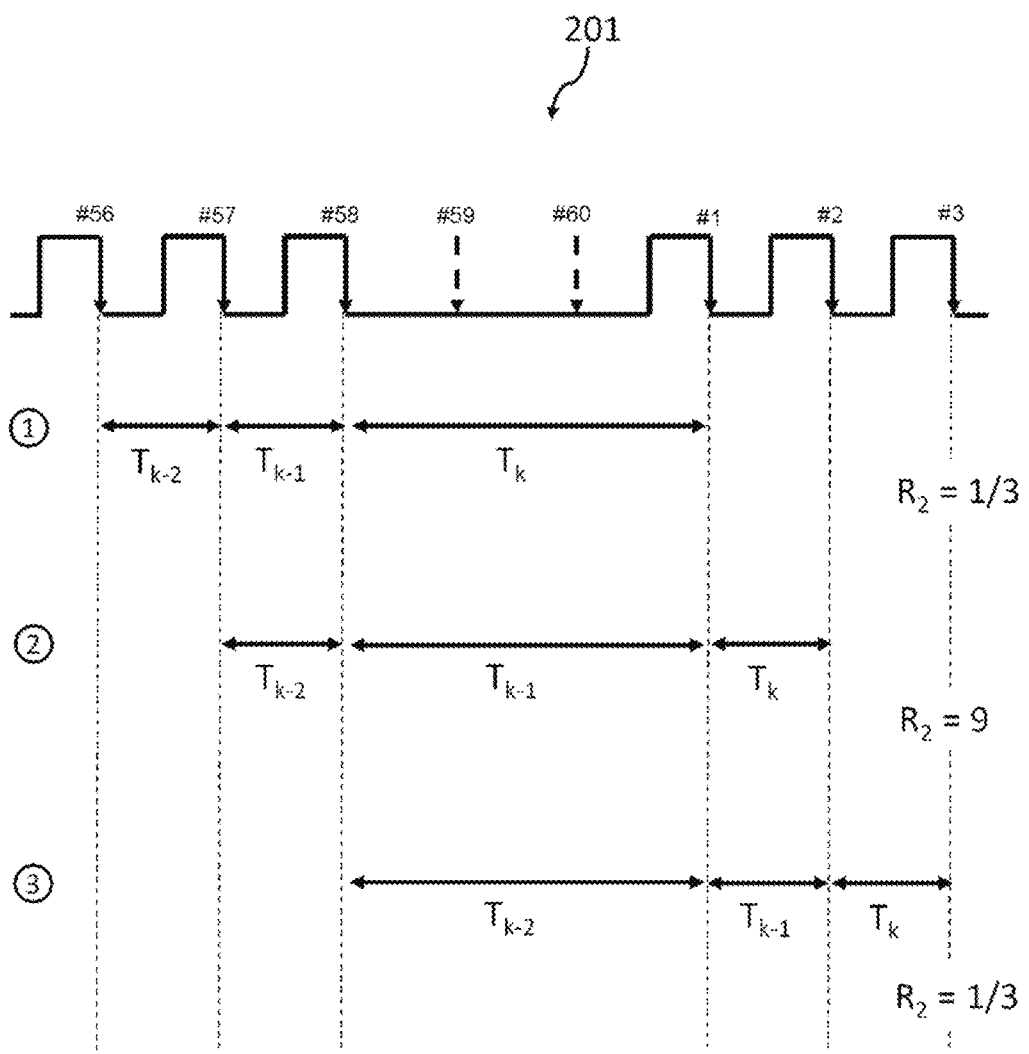
FIG. 2, already analyzed, shows an example of a signal generated by a sensor associated with a toothed wheel according to that described with reference to FIG. 1.

FIG. 2 shows an example of a signal 201 generated by a sensor associated with a toothed wheel according to that described with reference to FIG. 1. This signal is also called the CRK signal (for "crank"). In the example shown, the signal corresponds to a limited measurement window which covers the wheel reference zone and is obtained for a constant rotational speed of this wheel. The sensor has therefore generated a signal edge each time a tooth passes before it. Conventionally, the sensor generates a voltage, the instantaneous value of which reflects the detection of a gap (interval between two teeth), a tooth or an intermediate zone between the two. In the example of FIG. 2, the signal generated is of the square type, i.e. a signal with substantially vertical edges. Its value is at a maximum when the sensor is opposite a tooth and at a minimum when the sensor is opposite a gap. However, the type of signal generated may differ depending on the type of sensor used. It is in fact known to use different types of sensor to implement this measure. For example, for a variable reluctance sensor, the signal may be of the triangular type, i.e. a signal with inclined edges. For a bidirectional sensor, i.e. one which is able to determine the rotational direction of the target, the signal takes the form of a pulse, the width of which depends on the direction (typically 45 µs for forward rotation and 90 ρs for reverse rotation). The moment when the pulse begins precisely dates the edge.

In all cases, the engine control unit which receives and analyzes the signal relies on knowledge of the signal edges to follow the rotation of the wheel. More precisely, each time an edge is detected, the engine control unit increments an index attributed to the tooth detected. These may be either rising edges or falling edges, without this affecting determination of the angular position of the wheel.

By convention, the number k preceded by a hash symbol, i.e. symbols #k with k varying from 1 to n, designates the real tooth of number k in the series of n real teeth of the toothed wheel used. The value k=1 is attributed to the first tooth situated just after the reference zone in the forward rotation direction of the toothed wheel. Whenever a new tooth is detected, the value k is incremented and the angular position of the toothed wheel is therefore known. In particular, in the case of a toothed wheel for which the number n+m is equal to sixty, the theoretical angle between two teeth is six degrees. In other words, the angular position of the wheel is determined to the nearest six degrees.

The exemplary signal CRK shown in FIG. 2 therefore illustrates detection of teeth #56 to #3 of a toothed wheel having sixty teeth and a single reference zone (wherein n equals fifty-eight and m equals two). Allocation of the same indices to each tooth on each turn of the wheel, starting with k=1 for the first tooth situated after the angular reference zone, requires identification of this reference zone on each turn of the wheel. In particular, on the first turn of the wheel, the detected edges are used arbitrarily without being attributed to teeth with identified indices. As soon as the reference zone is detected for the first time, numbering restarts at k=1 and increases by 1 to n until the next time the reference zone is detected. The cycle is repeated as long as the wheel turns. Once the first turn has passed, a same tooth is normally given the same index k on each following turn. This guarantees the ability to determine the absolute angular position of the wheel to the nearest 360/(n+m) degrees.

Identification of the reference zone on each turn is necessary since it then allows certain identification of each real tooth on the periphery of the toothed wheel. It is all the more necessary since a local failure in detection of the teeth immediately causes an offset in the determination of the angular position. This is then poorly determined until the next time the reference zone is identified. For example, in the case shown in FIG. 2, an error of one tooth (addition of one extra tooth or failure to detect a tooth) falsifies determination of this angular position by six degrees. This type of circumstance may occur in particular for an oil-bath crankshaft when a particle of metal adheres to its periphery and is recognized by the sensor as a tooth of the toothed wheel.

As already had stated initially, the toothed wheel is rotationally secured to the crankshaft and used to identify its instantaneous angular position. The optimal synchronization of the engine control operations depends on the reliable determination of this angular position. It is therefore crucial to reliably identify the reference zone of the toothed wheel each time it passes in front of the sensor.

In its lower part, FIG. 2 illustrates how detection is achieved by performance of the known method. The periods $T_k$ associated with the teeth k are here measured between the falling edges of the signal 201 generated by the sensor. Detection of the reference zone relies in particular on measurement and use of these periods. More precisely, the method consists of performance of the following steps concurrently with each detection of a tooth of index k:

determination of the product of the period $T_{k-1}$ of the tooth with index k–1 by itself. This period $T_{k-1}$ corresponds to the duration which has elapsed between an edge of the signal associated with the tooth of index k–1 and the same edge of the signal associated with the preceding tooth of index k–2.

determination of the product of the period $T_{k-2}$ of the tooth with index k–2 by the period $T_k$ of the tooth with index k;

determination of the ratio of the first product over the second product (designated $R_2$ below);

comparison of the ratio $R_2$ with a threshold value (designated $R_{th1}$ below); and if $R_2$ is greater than $R_{th1}$, identification of the reference zone and consequently determination of the absolute angular position of the toothed wheel, and by association that of the crankshaft. In other words, as soon as the ratio $R_2$ exceeds a certain value, the engine control unit considers that it has recognized the tooth which has just been detected. In this case, this is tooth of index k=2, namely the second tooth situated after the reference zone on the periphery of the toothed wheel.

The engine control unit then attributes index k=1 to the first tooth it has identified as being situated just after the reference zone, and index k=2 to the following tooth which has just been detected. It then increments index k by 1 for each new tooth detected.

As an example, three different situations for determining the ratio $R_2$ are shown in the lower part of FIG. 2. In the three situations, respectively associated with numbering (1), (2) and (3), the determination is performed at the moment when the tooth of index k has just been detected. In particular, for situation (1), tooth k is tooth #1 of the signal shown; for situation (2), tooth k is tooth #2; and finally for situation (3), tooth k is tooth #3 of the signal shown. In each case, the period $T_k$ is the period associated with the last tooth is detected, while period $T_{k-1}$ is that associated with the preceding tooth, and period $T_{k-2}$ is that associated with the tooth preceding the tooth with index k–1.

The three values respectively obtained for the ratio $R_2$ in the three situations (1), (2) and (3) illustrate how the ratio varies around the reference zone. Its value passes from 1/3 to 9 then back to 1/3. The engine control unit which executes such a method thus identifies the reference zone as soon as this value exceeds a threshold value (typically 3). It is therefore clear from FIG. 2, as explained above, that this zone is identified at the moment when the second tooth (i.e. tooth #2) situated after this zone is detected. As has been explained above, FIG. 2 illustrates a situation in which the rotational speed of the toothed wheel is constant. The periods measured between each real tooth are therefore also constant. In this situation, the ratio $R_2$ is equal to 1 as long as it involves only periods measured between two real teeth. It is therefore suitable to use the value of this ratio in comparison with a threshold in order to identify the reference zone precisely on each turn of the wheel.

However, this period varies with the rotational speed of the toothed wheel. If the speed increases or reduces very quickly (i.e. during the three periods which serve to determine the ratio), the determined values of $R_2$ change accordingly. Despite this, it is known that this method for determining the absolute angular position of the toothed wheel is robust under such speed variations. In other words, even for significant speed variations, one of the determined values of the ratio $R_2$ around the reference zone is always significantly larger than the others. Therefore in practice it is always possible to set a threshold with which this value must be compared and which guarantees reliable identification of the reference zone.

However, as shown in FIG. 2, identification of the reference zone which allows determination of the absolute angular position of the toothed wheel on each turn occurs only when the second tooth situated after this zone, i.e. tooth #2 with index k=2, passes in front of the sensor. In particular in the hypothesis of false information, this has an impact on the angular position established by the engine control unit following incorrect tooth detection. In fact in this case, the error is only corrected at the time of detection of the second tooth situated after the reference zone, the next time this zone passes in front of the sensor. Thus, as stated above, synchronization of the engine control operations is degraded over the entire angular zone from incorrect detection of a tooth (by addition or omission) until detection of the reference zone. Adequate resynchronization of the control operations is therefore "delayed" by one tooth after the reference zone passes in front of the sensor.

Figure 3:
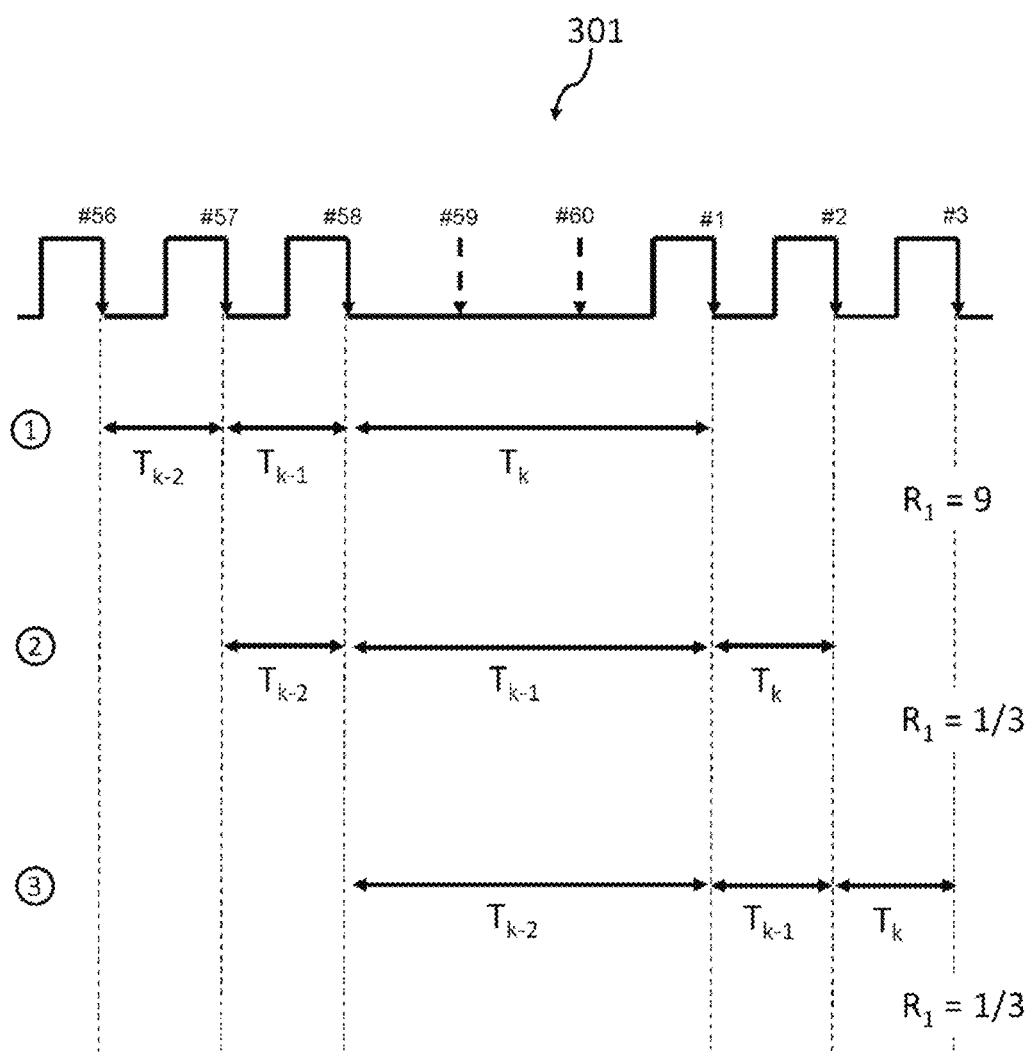
FIG. 3 shows an example of a signal generated by a sensor associated with a toothed wheel and used in a first embodiment of the method according to the invention.

FIG. 3 shows an example of a signal generated by a sensor associated with a toothed wheel and used in a first embodiment of the method according to the invention.

In the same way as for the known method described with reference to FIG. 2, the method according to embodiments of the invention is based on determining a ratio between different periods $T_k$ measured by a sensor and used by an engine control unit. The difference lies in the processing of the data corresponding to the different periods $T_k$. In fact the method consists of performance of the following steps concurrently with each detection of a tooth of index k:

determination of the product of the period $T_k$ of the tooth with index k by itself.

determination of the product of the period $T_{k-1}$ of the tooth with index k–1 by the period $T_{k-2}$ of the tooth with index k–2;

determination of the ratio of the first product over the second (designated $R_1$ below);

comparison of the ratio $R_1$ with a threshold value (designated $R_{th1}$); and if $R_1$ is greater than $R_{th1}$, identification of the reference zone and consequently determination of the absolute angular position of the toothed wheel, and by association that of the crankshaft.

In this specific case, in contrast to the method of the prior art, this is tooth of index k=1, namely the first tooth situated after the reference zone on the periphery of the toothed wheel.

The engine control unit then attributes index k=1 to the first tooth which it has just detected. It then increments index k by 1 for each new tooth detected.

Thus advantageously, correction of any error in determining the angular position of the crankshaft occurs each time at the moment of detection of the first tooth situated after the reference zone. True synchronization of the engine control operations therefore resumes earlier following incorrect detection of the tooth by addition or omission. The impact of an error in determination of the angular position of the crankshaft is therefore reduced. Consequently, the possible effects of "over-emission" of pollutant gases are also reduced.

The lower part of FIG. 3 also illustrates three different situations for determining the ratio $R_1$.

The three values respectively obtained for the ratio $R_1$ in the three situations (1), (2) and (3) illustrate how the ratio varies around the reference zone. Its value passes from 9 to 1/3 then again to 1/3. The engine control unit which executes such a method thus identifies the reference zone as soon as this value exceeds a threshold value (typically 3). It is therefore clear from FIG. 3, as explained above, that this zone is identified at the moment when the first tooth (i.e. tooth #1) situated after this zone is detected.

As has been explained above with reference to FIG. 2, FIG. 3 illustrates a situation in which the rotational speed of the toothed wheel is constant. The periods measured between each real tooth are therefore also constant. In this situation, the ratio $R_1$ is equal to 1 while it involves only periods measured between two real teeth. It is therefore suitable to use the value of this ratio in comparison with a threshold in order to identify the reference zone precisely on each turn of the wheel.

However, the person skilled in the art will understand that a great increase or reduction in the rotational speed is liable to significantly reduce the difference between the determined successive values of $R_1$. In other words, in a situation of strong acceleration or deceleration of the wheel, use of the ratio $R_1$ to identify the reference zone and accordingly determine the angular position of the wheel, may no longer be pertinent.

Figure 4:
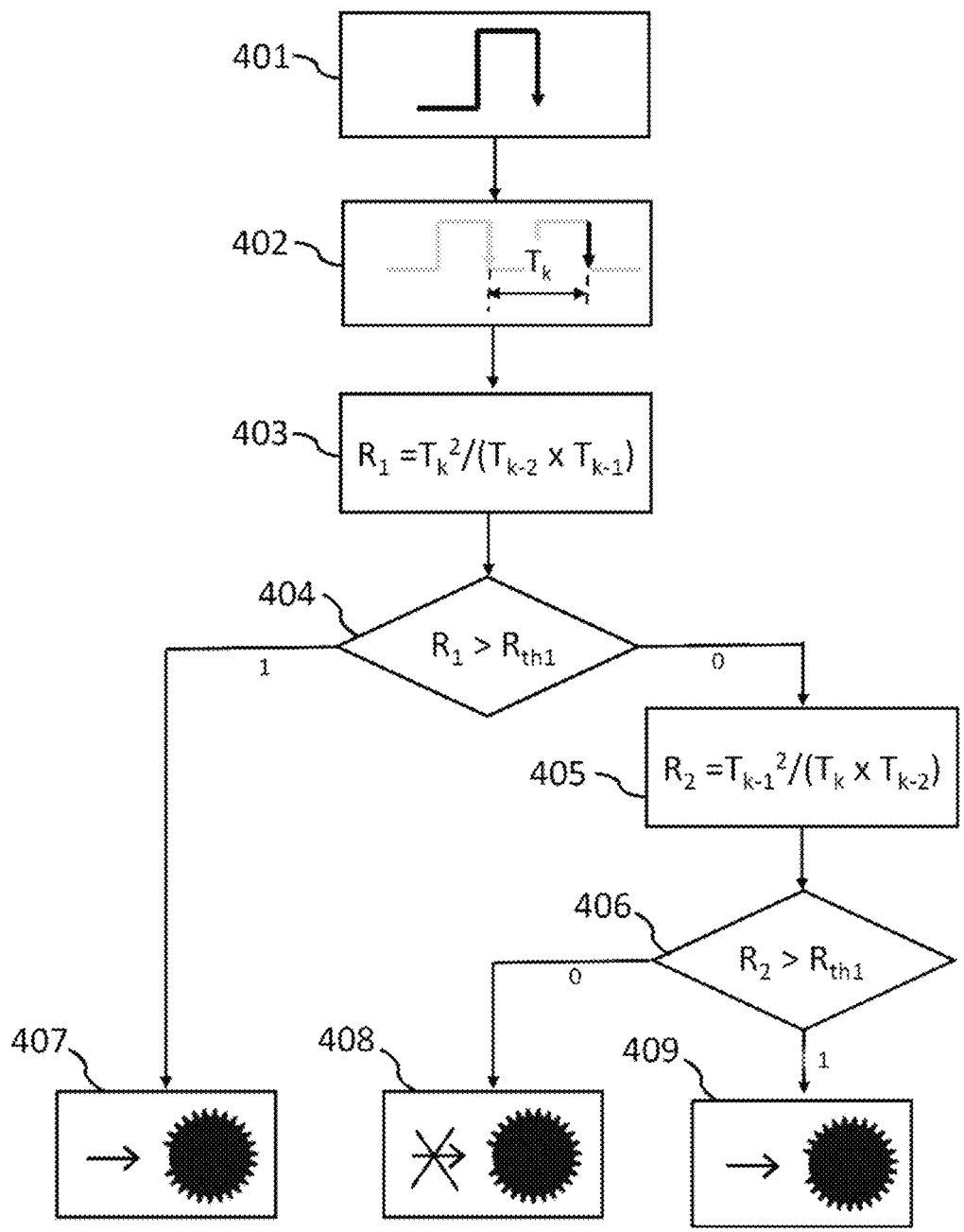
FIG. 4 shows a diagram of steps of a second embodiment of the method according to the invention.

FIG. 4 shows a diagram of steps of a second embodiment of the method according to the invention.

During step 401, the engine control unit detects a new edge in the signal generated by the sensor for detecting the teeth of the toothed wheel. This edge may be a rising or falling edge, straight or inclined. It belongs to a tooth of index k.

During the step 402, the engine control unit measures the duration (i.e. the time elapsed) between this edge and the preceding edge detected. This duration is the period $T_k$ separating the tooth of index k from the preceding tooth of index k−1 in the series of teeth in the signal generated by the sensor. As already stated above, the engine control unit generally stores in its memory the values of the periods T associated with the 120 last teeth detected, or at least the number of teeth corresponding to the angle separating two consecutive top dead centres (i.e. 30 periods for a target of 60 teeth on a 4-cylinder engine).

During the step 403, the engine control unit determines the ratio, designated $R_1$, of the product of the period $T_k$ by itself, over the product of the period $T_{k-1}$ by the period $T_{k-2}$.

During the step 404, the engine control unit compares the value obtained for ratio $R_1$ with a determined threshold value designated $R_{th1}$. For example, $R_{th1}$ may lie between 2.5 and 4.5 or $R_{th1}$ or may be precisely equal to 3.

If the value of $R_1$ is greater than the value of $R_{th1}$, the method executes step 407, during which the engine control unit identifies the reference zone and consequently determines the absolute angular position of the toothed wheel, and by association that of the crankshaft. The engine control unit then attributes index k=1 to the last tooth detected.

If the value $R_1$ is less than or equal to the value $R_{th1}$, the method executes step 405 during which the engine control unit determines the ratio, designated $R_2$, of the product of the period $T_{k-1}$ by itself to the product of the period $T_k$ by the period $T_{k-2}$.

During the step 406, the engine control unit compares the value obtained for ratio $R_2$ with the same determined threshold value designated $R_{th1}$.

If the value of $R_2$ is greater than the value of $R_{th1}$, the method executes step 409, during which the engine control unit identifies the reference zone and consequently determines the absolute angular position of the toothed wheel, and by association that of the crankshaft. The engine control unit then attributes index k=2 to the last tooth detected and index k=1 to the preceding tooth.

If the value $R_2$ is less than or equal to the value $R_{th1}$, the engine control unit considers that the reference zone has not been identified at the time of detection of tooth k. The method is then executed for each tooth detected.

Thanks to this implementation of the method, it is possible to identify the reference zone on the periphery of the toothed wheel as soon as the first tooth situated after this zone has been detected. Furthermore, in the hypothesis that the rotational speed of the wheel varies greatly, the reference zone is always identified using a value determined according to the prior art. The method thus allows determination of the angular position of the toothed wheel and of the crankshaft earlier than by application of a method of the prior art, while retaining at least the robustness of said method according to the prior art.

In variants (not shown) of this embodiment of the method according to the invention, steps 401 to 409 of the method are only executed in certain particular cases.

For example, in a particular embodiment, the following preliminary steps are executed:

a) determination of the ratio, designated $R_p$, of the period $T_k$ of the tooth with index k over the period $T_{k-1}$ of the tooth with index k−1;

b) comparison of the third ratio $R_p$ with a determined threshold value designated $R_{th2}$;

and, after performance of these steps, the other steps of the method are only executed if $R_p$ is greater than $R_{th2}$. Determination of the ratio $R_p$, known in itself by the person skilled in the art, allows use of the resources necessary for execution of all steps of the method only in the cases considered pertinent. In other words, determination takes place only if the first indicator "announces" the proximity of the reference zone. Conventionally, the threshold value used is equal to 1.4.

Also, in another embodiment of the method, steps 401 to 409 are only executed for values of tooth index k between n−1 (where n is the total number of real teeth of the toothed wheel) and 4. This limited tooth window in which the steps of the method are performed in principle allows identification of the reference zone when it passes in front of the sensor while limiting the resources used for the performance of the various determinations. This method of implementation nonetheless requires that all teeth of the toothed wheel have already been allocated an index k for the first time. In other words, when a complete turn of the wheel has already taken place after first detection of the reference zone.

Finally, the person skilled in the art will understand that the invention is not limited by either the number of teeth of the toothed wheel (real or hypothetical) or by the number of angular reference zone(s) present on the periphery of the wheel. Embodiments are possible in which the toothed wheel has more than one angular reference zone, for example two or three angular reference zones in different angular positions on the periphery of the toothed wheel.

In the claims, the term "comprise" or "include" does not exclude other elements or steps. A single processor or several other units can be used to implement the invention. The various features described and/or claimed can advantageously be combined. Their presence in the description or in different dependent claims does not exclude the possibility of combining them. The reference signs should not be understood as limiting the scope of the invention.

The invention claimed is:

1. A method for determining the angular position of a toothed target which is rotationally secured to a shaft of an internal combustion engine, said toothed target including a series of teeth regularly spaced around the periphery of the toothed target, of which n teeth are consecutive real teeth followed by m consecutive hypothetical teeth forming an angular reference zone, n and m being integral numbers not equal to zero, said internal combustion engine including a sensor configured to detect the passage of the real teeth of the toothed target before said sensor and generate a signal in response to said passage, and an engine control unit configured to receive said signal and from said signal, for each tooth of index k between 1 and n, measure the time period $T_k$ of the tooth with index k separating said tooth of index k from the preceding tooth of index k−1 in the series of teeth, said method comprising:
determining a first product by multiplying the period $T_k$ by itself;
determining a second product by multiplying the period $T_{k-1}$ by the period $T_{k-2}$ of the tooth with index k−2 in the series;
determining a first ratio, $R_1$ of the first product over the second product; and
comparing the first ratio $R_1$ with a first determined threshold value $R_{th1}$, and when $R_1$ is greater than $R_{th1}$, identifying the angular reference zone and determining an angular position of the associated toothed target and thereby the angular position of the shaft of the internal combustion engine.

2. The method as claimed in claim 1, further comprising: during the comparing, when the ratio $R_1$ is less than or equal to the first threshold value $R_{th1}$:
determining a third product by multiplying the period $T_{k-1}$ of the tooth with index k−1 by itself;
determining a fourth product by multiplying the period $T_{k-2}$ of the tooth with index k−2 by the period $T_k$ of the tooth with index k;
determining a second ratio $R_2$ of the third product over the fourth product; and
comparing the second ratio $R_2$ with the first threshold value $R_{th1}$, and when $R_2$ is greater than $R_{th1}$, identifying the angular reference zone and determining an angular position of the associated toothed target and thereby the angular position of the shaft of the internal combustion engine.

3. The method as claimed in claim 2, further comprising, before determining the first product, determining the second product, and determining the first ratio $R_1$:
determining another ratio $R_p$ of the period $T_k$ of the tooth with index k over the period $T_{k-1}$ of the tooth with index k−1;
comparing the ratio $R_p$ with a second determined threshold value $R_{th2}$, and the determining the first product, determining the second product, and determining the first ratio $R_1$ are performed when $R_p$ is greater than $R_{th2}$.

4. The method as claimed in claim 2, wherein the first threshold value $R_{th1}$ is between 2.5 and 4.5.

5. The method as claimed in claim 2, wherein the second threshold value $R_{th2}$ is equal to 1.4.

6. The method as claimed in claim 2, wherein the method is only executed for values of index k, associated with the teeth of the target, between n−1 and 4.

7. The method as claimed in claim 1, further comprising, before determining the first product, determining the second product, and determining the first ratio $R_1$:
determining another ratio $R_p$ of the period $T_k$ of the tooth with index k over the period $T_{k-1}$ of the tooth with index k−1;
comparing the ratio $R_p$ with a second determined threshold value $R_{th2}$, and the determining the first product, determining the second product, and determining the first ratio $R_1$ are performed when $R_p$ is greater than $R_{th2}$.

8. The method as claimed in claim 7, wherein the first threshold value $R_{th1}$ is between 2.5 and 4.5.

9. The method as claimed in claim 7, wherein the second threshold value $R_{th2}$ is equal to 1.4.

10. The method as claimed in claim 7, wherein the method is only executed for values of index k, associated with the teeth of the target, between n−1 and 4.

11. The method as claimed in claim 1, wherein the first threshold value $R_{th1}$ is between 2.5 and 4.5.

12. The method as claimed in claim 11, wherein the first threshold value $R_{th1}$ is equal to 3.

13. The method as claimed in claim 12, wherein the second threshold value $R_{th2}$ is equal to 1.4.

14. The method as claimed in claim 12, wherein the method is only executed for values of index k, associated with the teeth of the target, between n−1 and 4.

15. The method as claimed in claim 11, wherein the second threshold value $R_{th2}$ is equal to 1.4.

16. The method as claimed in claim 11, wherein the method is only executed for values of index k, associated with the teeth of the target, between n−1 and 4.

17. The method as claimed in claim 1, wherein the second threshold value $R_{th2}$ is equal to 1.4.

18. The method as claimed in claim 1, wherein the method is only executed for values of index k, associated with the teeth of the target, between n−1 and 4.

19. The method as claimed in claim 1, wherein the number n is equal to 58 and the number m is equal to 2.

20. A device for determining the angular position of a toothed target which is rotationally secured to a shaft of an internal combustion engine, said toothed target including a series of teeth regularly spaced around the periphery of the target, of which n teeth are consecutive real teeth followed secondly by m consecutive hypothetical teeth forming an angular reference zone, n and m being integral numbers not equal to zero, said internal combustion engine including a sensor configured to detect the passage of the real teeth of the toothed target before said sensor and generate a signal in response to said passage, and an engine control unit configured to receive said signal and from said signal, for each tooth of index k between 1 and n, measure the time period $T_k$ of the tooth with index k separating said tooth of index k from the preceding tooth of index k−1 in the series of teeth,
wherein, in said device, the engine control unit is configured to implement the method for determining the angular position of the toothed target which is rotationally secured to the shaft of the internal combustion engine as claimed in claim 1.

* * * * *